US012624729B2

(12) United States Patent
Kohlrusch et al.

(10) Patent No.: US 12,624,729 B2
(45) Date of Patent: May 12, 2026

(54) WIND TURBINE AND BEARING ARRANGEMENT THEREFOR

(71) Applicant: Nordex Energy SE & Co. KG, Hamburg (DE)

(72) Inventors: Matthias Kohlrusch, Schwaan (DE); Arno Dahnke, Rostock (DE)

(73) Assignee: Nordex Energy SE & Co. KG, Hamburg (DE)

( * ) Notice: Subject to any disclaimer, the term of this patent is extended or adjusted under 35 U.S.C. 154(b) by 50 days.

(21) Appl. No.: 18/670,481

(22) Filed: May 21, 2024

(65) Prior Publication Data

US 2024/0392834 A1 Nov. 28, 2024

(30) Foreign Application Priority Data

May 23, 2023 (EP) ..................................... 23174821

(51) Int. Cl.
*F16C 33/66* (2006.01)
*F03D 80/70* (2016.01)

(52) U.S. Cl.
CPC ........ *F16C 33/6685* (2013.01); *F03D 80/709* (2023.08); *F16C 2360/31* (2013.01)

(58) Field of Classification Search
CPC .............................. F03D 80/70; F16C 2360/31
See application file for complete search history.

(56) References Cited

U.S. PATENT DOCUMENTS

| | | | |
|---|---|---|---|
| 10,145,463 B2 | 12/2018 | Doertoluk et al. | |
| 12,006,976 B2 * | 6/2024 | Bager | F16C 33/6625 |
| 2020/0116134 A1 | 4/2020 | Rogg | |
| 2021/0088029 A1 * | 3/2021 | Rogg | F03D 15/00 |

FOREIGN PATENT DOCUMENTS

| | | |
|---|---|---|
| DE | 32 31 016 A1 | 2/1984 |
| DE | 10 2015 221 412 A1 | 5/2017 |
| EP | 2 246 562 A2 | 11/2010 |
| EP | 1 856 409 B1 | 11/2014 |
| EP | 3 173 642 A1 | 5/2017 |
| EP | 3 574 213 B1 | 8/2020 |
| WO | 2021/219524 A1 | 11/2021 |

OTHER PUBLICATIONS

Extended European Search Report of the European Patent Office dated Oct. 27, 2023 in European application No. 23174821.1 on which the claim of priority is based.

* cited by examiner

*Primary Examiner* — Justin D Seabe
(74) *Attorney, Agent, or Firm* — Walter Ottesen, P.A.

(57) ABSTRACT

A bearing arrangement for a wind turbine includes a bearing and a bearing housing. The bearing housing defines an interior space wherein the bearing is accommodated. A discharge opening is provided for discharging lubricant from the interior space. A pipe system includes a fluidic connection with the discharge opening. The pipe system includes a first part inclining upwardly to a predetermined height relative to the discharge opening to throttle a lubricant flow out of the interior space.

16 Claims, 10 Drawing Sheets

WIND TURBINE AND BEARING ARRANGEMENT THEREFOR

CROSS-REFERENCE TO RELATED APPLICATIONS

This application claims priority of European patent application no. 23174821.1, filed May 23, 2023, the entire content of which is incorporated herein by reference.

TECHNICAL FIELD

The disclosure relates to a bearing arrangement for a wind turbine, in particular to a rotor bearing arrangement. The disclosure further relates to a wind turbine, in particular to a wind turbine which includes a bearing arrangement as described herein.

BACKGROUND

A wind turbine may include a rotor that includes a rotatable rotor assembly having multiple rotor blades. The rotor blades transform wind energy into a drive torque that drives the generator via a drive train.

SUMMARY

It is an object of the disclosure to provide a bearing arrangement which provides a reliable operation. It is a further object of the disclosure to provide a wind turbine exhibiting a reliable operation.

Embodiments of the disclosure provide a bearing arrangement for a wind turbine. The bearing arrangement includes a bearing. The bearing arrangement includes a bearing housing. The bearing housing houses an interior space in which the bearing is arranged. The bearing arrangement includes an opening configured to discharge lubricant from the interior surface.

The bearing arrangement includes a pipe system. The pipe system includes a fluidic connection with the opening. The pipe system includes a first part. The first part inclines upwards to a predetermined height relative to the opening to throttle a lubricant flow out of the interior space.

For example, the bearing arrangement is a rotor bearing arrangement of a wind turbine. In an embodiment, the rotor bearing arrangement may correspond to both the rotor side bearing and the gearbox side bearing. The bearing arrangement, and in particular the bearing, is for example lubricated with grease or another lubricant, like an oil. It is important to contain a desired amount of lubricant inside the bearing housing in the interior space. An insufficient amount of lubricant in the bearing leads to higher wear and premature failure. On the other hand, high splashing losses lead to temperature increase and therefore reduce base viscosity which leads to lower film thickness, and eventually to premature failure. Thus, it is important to ensure sufficient lubrication and to avoid lubricant starvation and to keep splashing losses low. An uncontrolled lubricant leakage should be avoided, in particular a leakage through a sealing of the bearing arrangement. Therefore, the opening is provided to allow a controlled draining and discharging of the lubricant.

The pipe system with the first part that inclines upwards acts like a choke or a throttle to dampen, limit or control the outflow of the lubricant. During operation, the lubricant loses its momentum and/or energy as it flows through the first part. The inclining first part leads to a higher friction resistance to the flow of the lubricant, in particular due to at least one of the geodetic height to be overcome and the length of the first part, among other characteristics of the pipe system. Thus, the pipe system with the first part that inclines upwards allows an outflow of the lubricant in a controlled manner, wherein an undesirably high outflow of lubricant can be avoided. The amount of lubricant inside the bearing can be reliably kept within given thresholds. In particular, the predetermined height is predetermined dependent on, but not limited to the given thresholds, overall dimensions of the bearing housing, and/or an angle of inclination of the first part.

The bearing arrangement makes a lubricant level up to 100% possible in the bearing housing. Insufficient lubrication of the bearing can be reliably avoided. The arrangement of the pipe system with the first part inclining upwards functions as an overflow and/or pressure relief valve. For example, if lubricant is added even though the interior space is already 100% full, excess lubricant flows out through the pipe system. The pipe system can be easily and reliably retrofitted to existing bearings and configurations without costly reconfiguration. The need for expensive conversion parts can be avoided.

According to an embodiment, the bearing housing may include the opening. The opening is configured to drain lubricant from the interior space. The opening reaches from the interior space through the bearing housing, in particular a bearing cover, to the outside of the bearing housing. The pipe system is arranged outside of the interior surface. The pipe system is arranged outside of the bearing housing. Lubricant from the interior space flows through the opening first before it enters the pipe system located outside of the bearing housing.

After flowing through the opening, the lubricant is guided in the pipe system outside the bearing housing. This enables an easy retrofitting of the pipe system to the existing bearings to effect discharge of the lubricant when required. Furthermore, installation space can be used efficiently. In the embodiment according to which the pipe system is arranged outside the bearing housing, there is no requirement to access or arrange parts inside the interior space. Thus, the functionality and configuration of the interior space with the bearing does not need to be changed. The bearing housing is provided with the opening extending from the interior space to the outside of the bearing housing, such that the pipe system is fluidically connected to the opening outside of the bearing housing.

According to an embodiment, the pipe system includes the opening. The opening is formed, for example, as an inlet opening of the pipe system. For example, the pipe system is arranged inside the bearing housing, in particular in the interior space, such that the opening in the pipe system comes in fluid communication with the interior space. The lubricant being circulated enters the pipe system through the opening and is guided through a part or portion of the pipe system located inside the interior space. Further, the bearing arrangement includes a second opening. The second opening is configured for letting lubricant out of the interior space to the external environment of the bearing. In particular, the second opening is arranged at the predetermined height, for example, above the first opening. In an embodiment, the opening and the first part are arranged inside the interior space. The first part inclines upwards in the interior space up to the second opening, which reaches through the bearing housing, in particular the bearing cover, from the interior space to the outside of the bearing housing. The lubricant exits the interior space through the second opening after it has been guided through the inclining first part inside the interior space.

The arrangement of the opening and the first part inside the interior space allows for a placement of the first part inside existing dead space of the interior space. Thus, no additional installation space for the first part is necessary outside the bearing housing. Furthermore, the first part inside the interior space reduces dead space and this leads to better lubrication.

According to an embodiment, the pipe system includes a second part. The second part is inclined downwards and includes an outlet port. The second part is fluidically connected to the first part, the first part located either inside or outside the bearing housing. Lubricant is releasable through the outlet port, for example into a collection container. Lubricant which enters the first part through the opening can be reliably transferred to the second part. From the second part the lubricant can be reliably guided to the collection container via the outlet port. This increases flexibility for the arrangement of the collection container, for example at a distance from the bearing housing.

According to an embodiment, each of the first part and the second part includes a hose. For example, the hose of the first part is fluidically connected to the opening outside of the bearing housing. The hose is flexible, for example. This allows freedom for the arrangement of the pipe system relative to the bearing housing.

According to an embodiment, the first part includes a smaller diameter than the second part. This allows a flow characteristic in the first part that is different than in the second part. In an embodiment, the flow characteristic may be, but not limited to pressure and momentum of the lubricant during the flow. Thus, a suction effect of the lubricant present in the second part on the lubricant present in the first part due to the downward inclination of the second part can be reduced or avoided. The throttle and/or choke effect for the lubricant is realized mainly by the first part. The second part realizes a guidance of the lubricant to the collection container.

According to an embodiment, the second part includes an open drain channel instead of a hose. Thus, the suction effect can be completely avoided.

According to an embodiment, the outlet port is arranged above the opening. In particular, the outlet port is arranged above the opening along a vertical direction. The arrangement of the outlet port above the opening leads to a reduction or avoidance of the suction effect.

According to an embodiment, the pipe system includes a transition part. The transition part connects the first part and the second part at the predetermined height. For example, the transition part is arranged outside of the bearing housing. This particularly applies if the pipe system, and in particular the first part, is arranged outside of the bearing housing.

If the first part is arranged inside the interior space, the transition part for example leads through the bearing housing to the second part, which is arranged outside of the bearing housing. For example, the transition part is at least partly realized by the second opening.

According to an embodiment, the pipe system includes a valve, in particular a breather valve disposed at the transition part. Alternatively, or in addition a throttle valve may be disposed at the transition part to throttle grease flow out of the opening and in turn, from the interior space. The pipe system can be vented in a controlled manner by the use of the breather valve. The throttle valve allows for additional controlled throttling of the lubricant flow through the pipe system.

According to an embodiment, the bearing arrangement includes a control unit which is operatively coupled to at least one of the valves. For example, the control unit is additionally operatively coupled to one or more sensors. The control unit, for example, includes at least one processor and memory storage. The control unit is configured to send operation information and instructions to the valve, for example to set the valves as desired depending on outside conditions.

According to an embodiment, the bearing arrangement includes a thermal control module for regulating the temperature of the pipe system. For example, the thermal control module is an active control module which is operatively coupled to the control unit, such that the control unit can control the thermal control module. For example, the thermal control module is configured to heat and/or cool the pipe system such that lubricant inside the pipe system is heated and/or cooled.

For example, the thermal control module includes an insulation for insulating the pipe system such that an interior of the pipe system can be kept at a different temperature than the outside, for example warmer than the outside or colder than the outside. Alternatively, or in addition, the thermal control module includes a heater for heating the pipe system. Alternatively, or in addition, the thermal control module includes a cooler for cooling the pipe system.

The thermal control module allows control of the temperature of the pipe system depending on external environmental conditions in order to maintain at least one of a desired density, viscosity and/or other properties of the lubricant inside the pipe system.

According to an embodiment, an interior surface of at least a portion of the pipe system includes a predetermined coefficient of friction and/or predetermined roughness to throttle grease flow out of the opening. For example, at least one protrusion and/or a coating is provided on the interior surface to provide the desired roughness and friction. A desired resistance, damping effect and throttle of the lubricant flow can be realized with the pipe system. For example, the first part includes a different coefficient of friction and/or predetermined roughness than the second part. For example, the friction and/or roughness of the interior surface of the first part is greater than that of the second part.

According to an embodiment, the bearing housing has a vertical height such that the predetermined height is at least one eighth of the vertical height of the bearing housing. In an embodiment, the opening is located at a lower hemispherical portion of the bearing housing and the vertical height is arranged at a higher hemispherical portion of the bearing housing. Other heights of the predetermined height are possible, for example from one eighth of the vertical height of the bearing housing to a top of the interior space. It is possible that the predetermined height is at the top of the interior space, such that the interior space is completely filled with lubricant. According to other embodiments, the predetermined height is pre-set so that the interior space is more than 50% filled with lubricant, for example more than 60%, more than 70% or more than 75%.

According to an embodiment, the opening is located at a lower hemispherical portion of the bearing housing. The first part, for example, reaches from the lower hemispherical portion to the upper hemispherical portion, such that the predetermined height is for example equal to or above the center of the bearing. According to a further embodiment, the pipe system is completely arranged in the lower hemispherical portion such that the predetermined height is equal to or below the center of the bearing.

Further embodiments of the disclosure provide a wind turbine, wherein the wind turbine includes a nacelle. The wind turbine includes a bearing arrangement according to one of the described embodiments. The bearing arrangement is arranged within the nacelle.

BRIEF DESCRIPTION OF DRAWINGS

The invention will now be described with reference to the drawings wherein.

DETAILED DESCRIPTION

Figure 1:
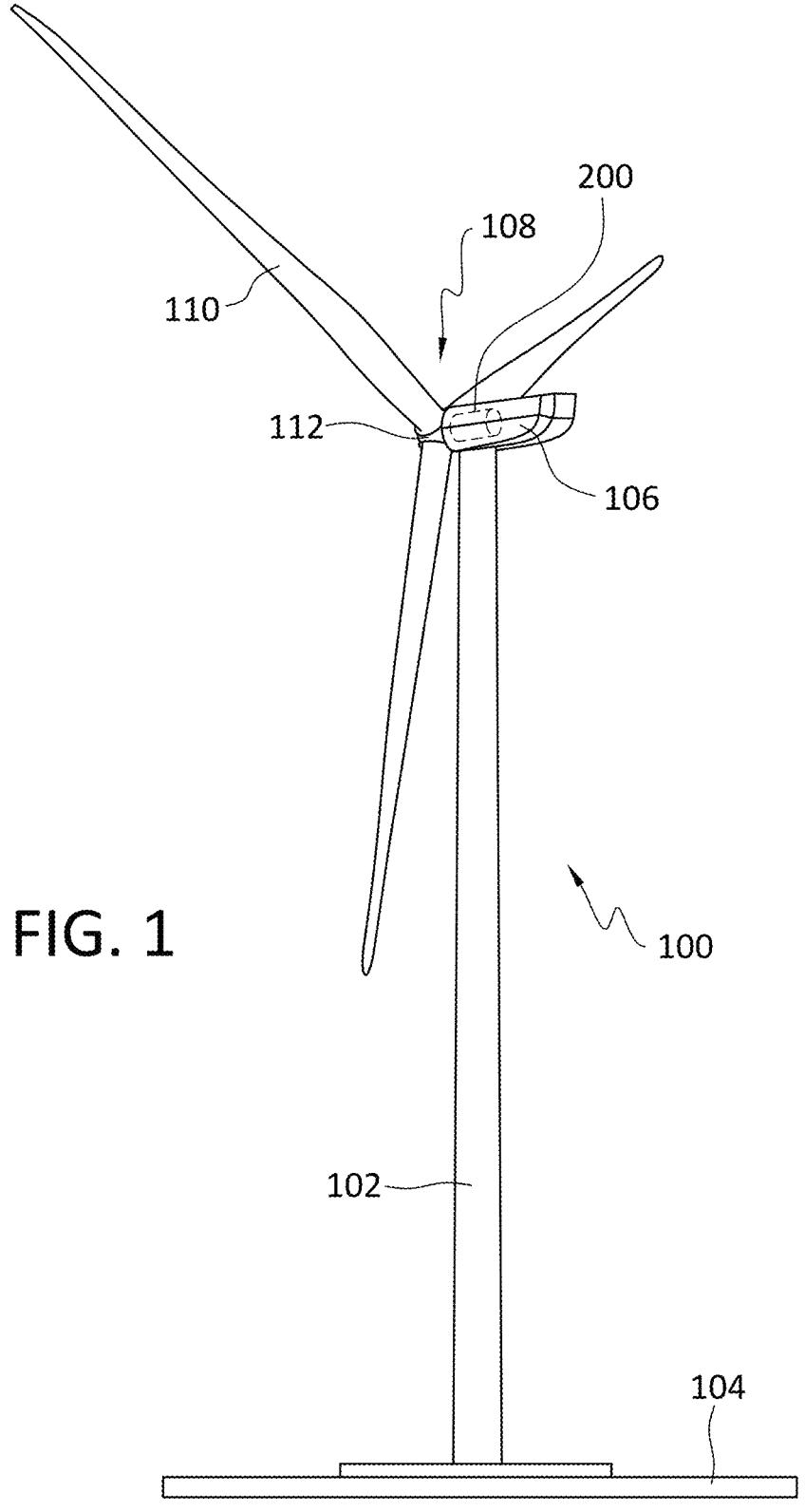
FIG. 1 is a schematic view of a wind turbine according to an embodiment.
Figure 3:
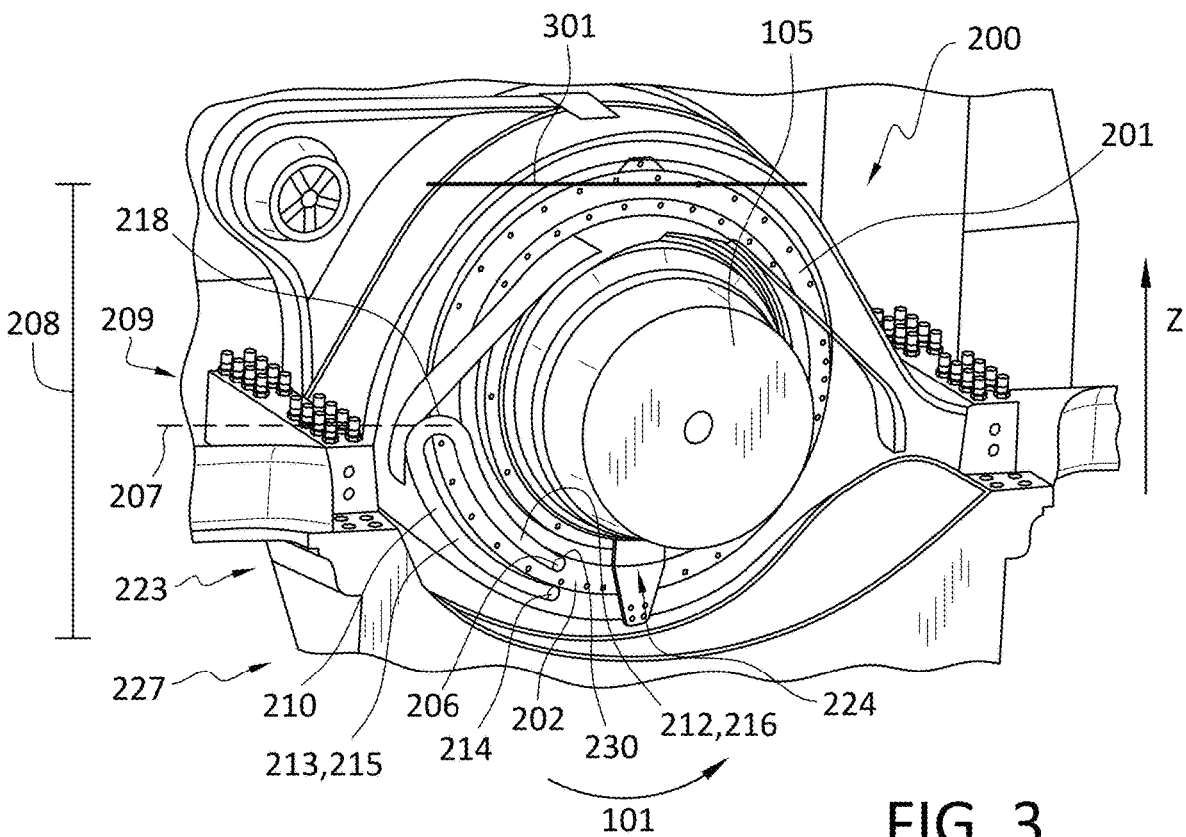

As shown in FIG. 1, a wind turbine 100 includes a tower 102. The tower 102 is connected to a foundation 104 fixed on ground. The foundation 104 is formed in and supported by the ground. A nacelle 106 is arranged on a top end of the tower 102 opposite to the foundation 104. The nacelle 106 houses the drive train, among other components and subassemblies. Inside the nacelle 106, for example, a generator is arranged which is connected via the drive train to a rotor 108. The drive train includes, for example, a gearbox and a rotor shaft 105 (FIG. 3). The rotor 108 includes several rotor blades 110. The rotor blades 110 are mounted on a rotor hub 112. The rotor hub 112 is connected to the rotor shaft 105.

The rotor 108 is driven in operation by an airflow, for example wind. The rotational movement of the rotor 108 is transmitted via the drive train to the generator. The generator converts the mechanical output of the rotor 108 into electrical energy.

The wind turbine 100 includes a bearing arrangement 200. According to the shown embodiments the bearing arrangement 200 is a rotor bearing arrangement. The rotor shaft 105 is rotatably supported by the bearing arrangement 200. In an embodiment, the rotor bearing arrangement 200 may correspond to both the rotor side bearing arrangement and the gearbox side bearing arrangement, supporting the shaft 105 at the rotor side and the gearbox side, respectively.

Figure 2:
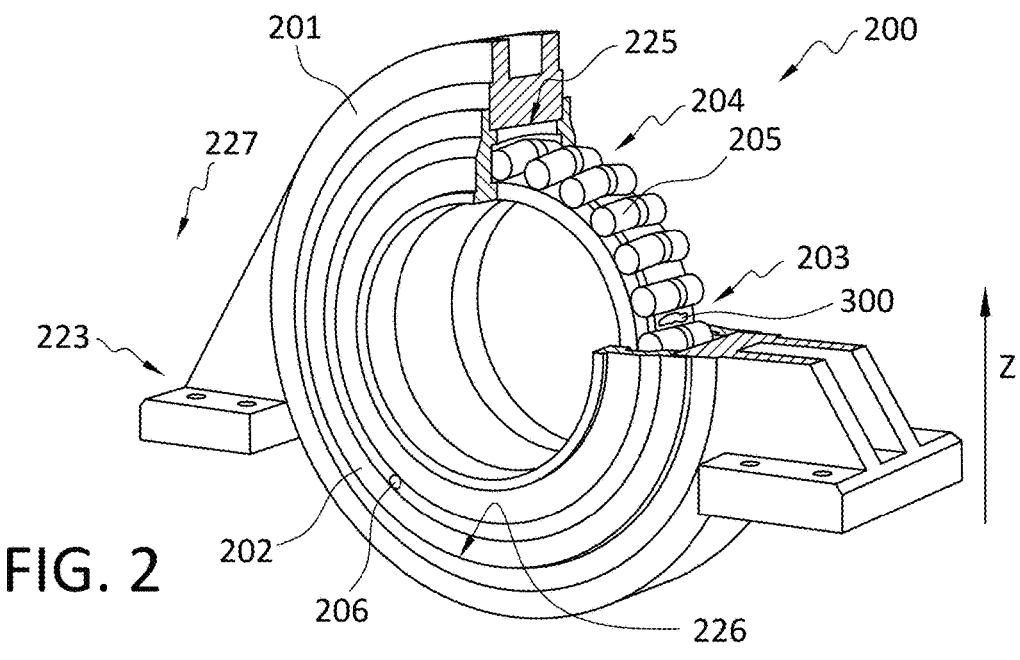
FIGS. 2 to 14 are schematic views of rotor bearing arrangements and details thereof according to different embodiments.

FIG. 2 shows a bearing arrangement 200 according to an embodiment. The bearing arrangement 200 includes a bearing housing 201. The bearing housing 201 defines an interior space 203. A bearing 204 is located in the interior space 203. The interior space 203 may receive a lubricant, including, but not limited to grease and a lubricating oil from a lubricant source.

The bearing 204 includes an inner ring, an outer ring and rolling elements 205 which enable the relative rotation between the inner ring and the outer ring. The inner ring may be connected to the shaft 105 and the outer ring may be connected to the bearing housing 201.

The interior space 203 is sealed by a bearing cover 202 on the front side and/or on the rear side of the bearing housing 201 during operation, wherein the front side corresponds, for example, to a side facing or proximal to the gearbox (not explicitly shown) and the rear side corresponds, for example, to the side opposite to or distant from the gearbox. According to a further example, the front side corresponds to a side facing or proximal to the rotor 108 and the rear side corresponds, for example, to the side opposite to or distant from the rotor 108.

Figure 11:
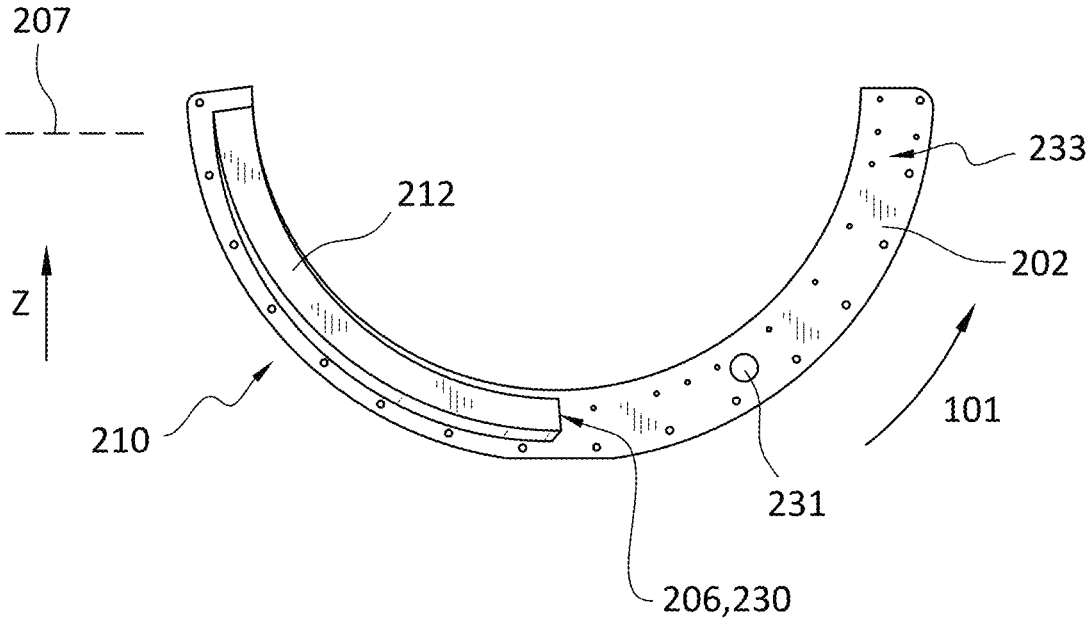
Figure 13:
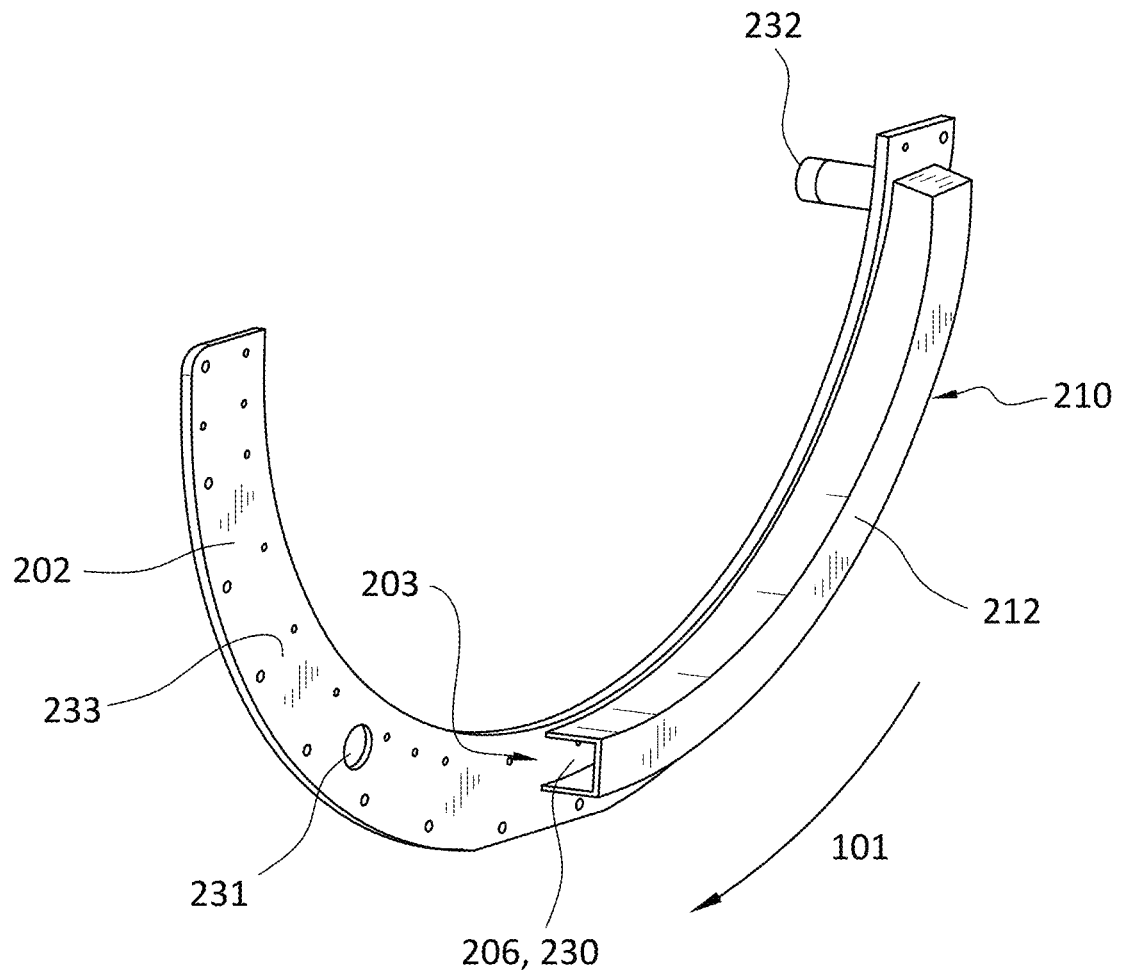
Figure 14:
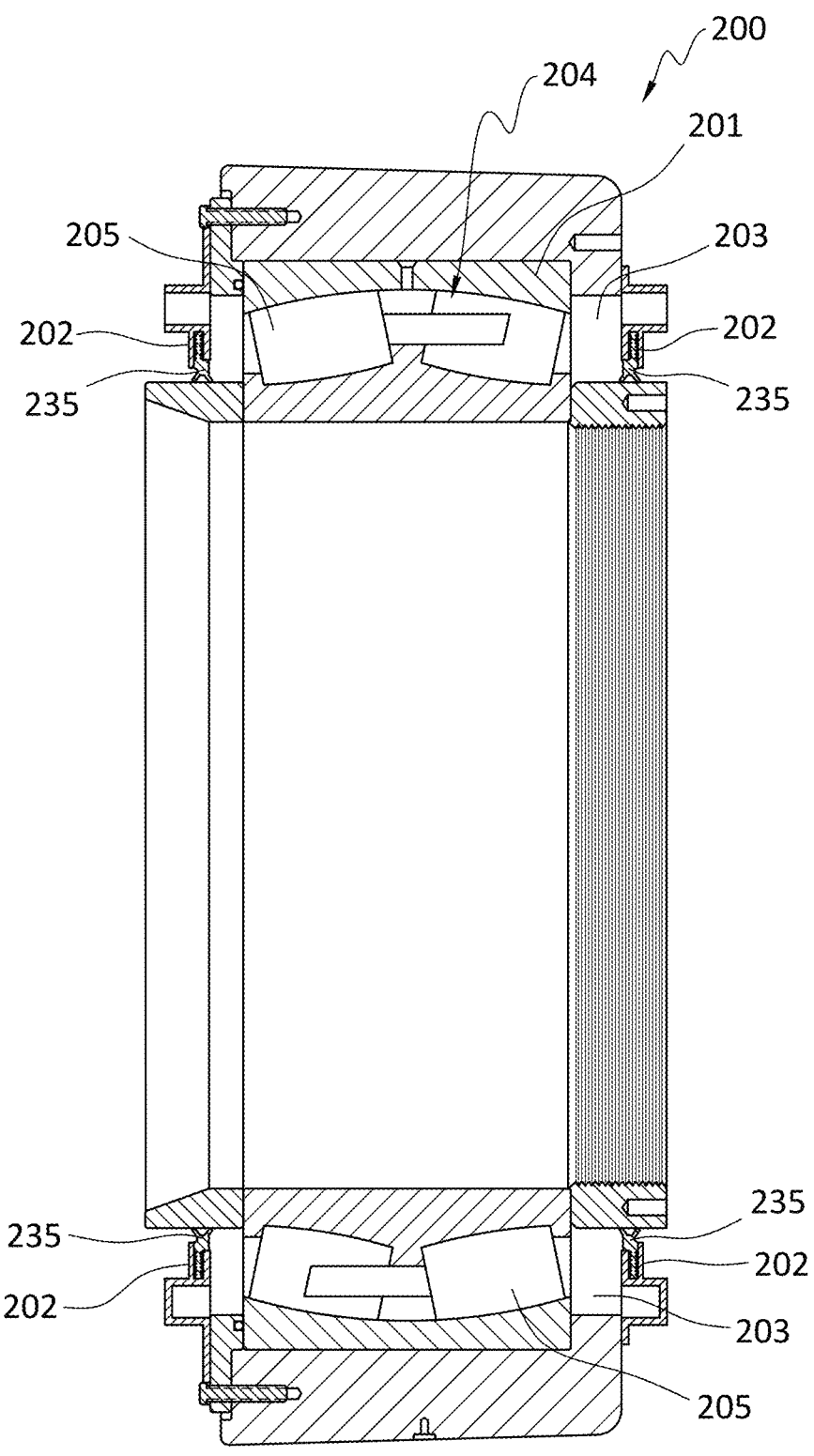

The bearing housing 201, and in particular the bearing cover 202, includes an opening 206. The opening 206, which may be a drain hole defined in the bearing housing, provides a passage through the bearing housing 201. The opening 206, in particular, may be arranged in a lower half of the bearing housing 201 which is next to a bottom 224 of the interior space 203. In an embodiment, the opening 206 may serve as a passageway between the bearing interior space 203 and the bearing exterior. According to further embodiments, the opening 206 is arranged inside the interior space 203, as for example shown in FIGS. 11 and 13.

The lubricant 300 is provided in the interior space 203 for lubricating the bearing 204 and in particular the rolling elements 205. The lubricant 300 in particular includes grease.

The lubricant 300 is provided in the interior space 203 with a desired lubricant level 301 (FIG. 3). In particular, the desired lubricant level 301 reaches an upper hemispherical part 209 of the bearing housing 201, which is arranged between the center and the top 225.

Old or dirty lubricant 300 can be drained via the opening 206 out of the interior space 203. Alternatively or in addition, if too much lubricant 300 is present in the interior space 203, this lubricant 300 can be released through the opening 206 in a controlled manner. With the opening 206, which can also be referred to as "drain hole 206", uncontrolled outflow of the lubricant 300 out of the interior space 203 is avoidable according to embodiments of the disclosure. Further, it can be ensured that a sufficient amount of lubricant 300 is maintained inside the interior space 203 by a pipe system 210 which provides a resistive effect, limiting effect or damping effect, thereby throttling the lubricant flow, which will be explained in more detail below.

FIG. 3 shows a first example of the bearing arrangement 200 with the pipe system 210. The bearing cover 202 includes the opening 206 in a lower hemispherical portion 223 of the bearing housing 201. In particular, the opening 206 is arranged near a bottom 224 of the interior space 203. The opening 206 provides a passageway between the interior space 203 and the outside 227 of the bearing housing 201. The opening 206 is arranged in advance of the opening 206 in a direction of rotation 101 of the shaft 105.

The pipe system 210 includes a first part 212. The first part 212, for example, includes a hose, in particular an upwards directed hose 216. An inlet 230 of the pipe system 210 and in particular of the first part 212 includes fluidic connection 211 with the opening 206. Thus, the lubricant 300 can get into the first part 212 through the opening 206. In other words, the opening 206 discharges or directs the lubricant from the interior space 203 into the first part 212.

As shown, the first part 212 is inclined upwards up to a predetermined height 207 relative to the opening 206, measured along a vertical height of the bearing. In an embodiment, the first part 212 extends above the opening 206 up to the predetermined height 207, say up to 50% or higher of the overall height of the bearing housing 201.

Figure 8:
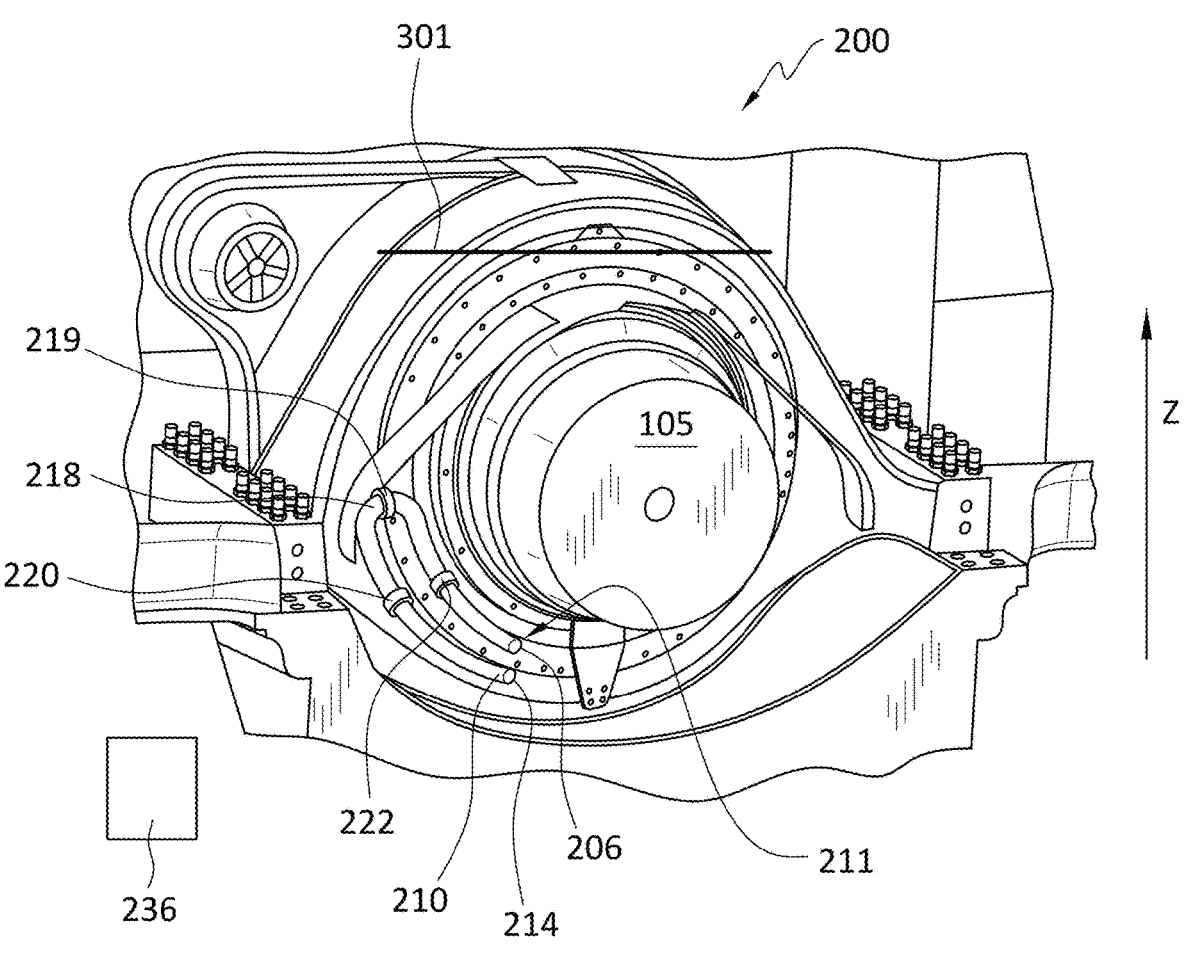

At the predetermined height 207, the pipe system 210 includes a transition part 218. In particular, the first part 212 may undergo a transition, including but not limited to a bend. The transition part 218 includes, for example, a horizontal part effecting the bend. The transition part 218, for example, may be a continuous part, in particular a single-piece component. According to further examples, the bended part 218 includes a multi-pieced connection where the transition part 218 is a separate element adjoining or connected to the first part 212. The transition part 218 can include a U-shape, can from a 180° bend, a 120° bend or a 90° bend or any other bend between 10° and 270°. As shown in FIGS. 3 and 8, the transition part 218 may form a hairpin bend with the first part 212. Throughout the description, the transition part 218 may be interchangeably referred to as "bended part 218".

Figures 5, 6:
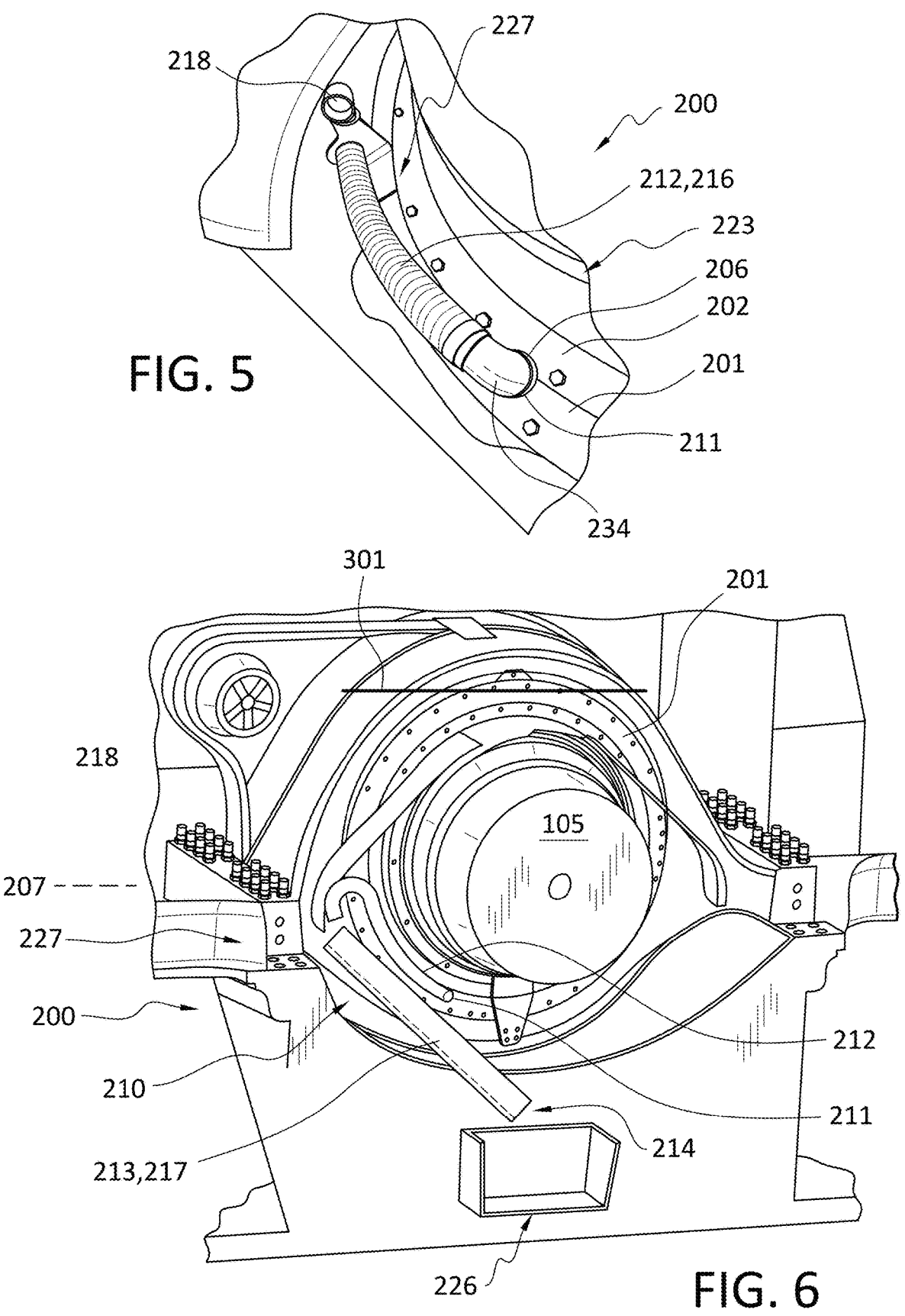

The transition part 218, for example, is arranged at a region around a center of the bearing 204 or above the center of the bearing 204 along a vertical direction Z. The bended part 218 is arranged beside the shaft 105 along a horizontal direction which is perpendicular to the vertical direction Z. The bearing housing 201 includes a vertical height 208 along the vertical direction Z. The bended part 218 is arranged in a middle region of the vertical height 208. For example, the bended part 218 is arranged at an intersection of the lower hemispherical portion 223 and the upper hemispherical portion 209. Alternatively, the bended part 218 is arranged in the upper hemispherical portion 209 adjacent to the lower hemispherical portion 223 along the vertical direction Z. This way, the geodetic height of the bended part 218 is higher than the opening 206 which resists upward flow of the lubricant inside the first part 212 during the rotation of the shaft 105 and the bearing. The first part 212, which may be the flexible hose 216, may be clamped along a circumference or periphery of the bearing cover 202 as illustrated in FIG. 5.

The pipe system 210 includes a second part 213 which is arranged subsequently to the bended part 218. The second part 213, for example, includes a downwards directed hose 215 which adjoins the first part 212 via the bended part 218. The downwards hose 215 extends from the bended part 218 downwards along the vertical direction Z to terminate at an outlet port 214. The outlet port 214 is the exit of the pipe system 210 and is, for example, part of the second part 213. In an embodiment, the outlet port 214 may be above or below or at same level as of the opening 206 considered along a vertical direction Z.

The downwards hose 215 and the upwards hose 216 are each flexible such that they for example constitute the bended part 218 to reverse the direction of the lubricant flow.

During operation, the lubricant 300 exits the interior space 203 and enters the pipe system 210 via the opening 206. The lubricant 300 loses its momentum and/or energy while it flows from the opening 206 upwards in the first part 212. Thus, the upwards directed first part 212 acts as a damper and/or throttle to resist the outflow of the lubricant 300 out of the interior space 203.

If the lubricant 300 reaches the predetermined height 207 and the bended part 218, which is arranged above the opening 206 and the inlet 230, the lubricant 300 exits the first part 212 through the bended part 218 and subsequently, the second part 213. The lubricant flows from the first part 212 to the second part 213 through the bended part 218.

The second part 213, and in particular the outlet port 214, is in fluidic communication with a collection container 226 (FIG. 6). The collection container 226 is provided for collecting lubricant 300 which gets drained out of the interior space 203 via the pipe system 210.

Figure 12:
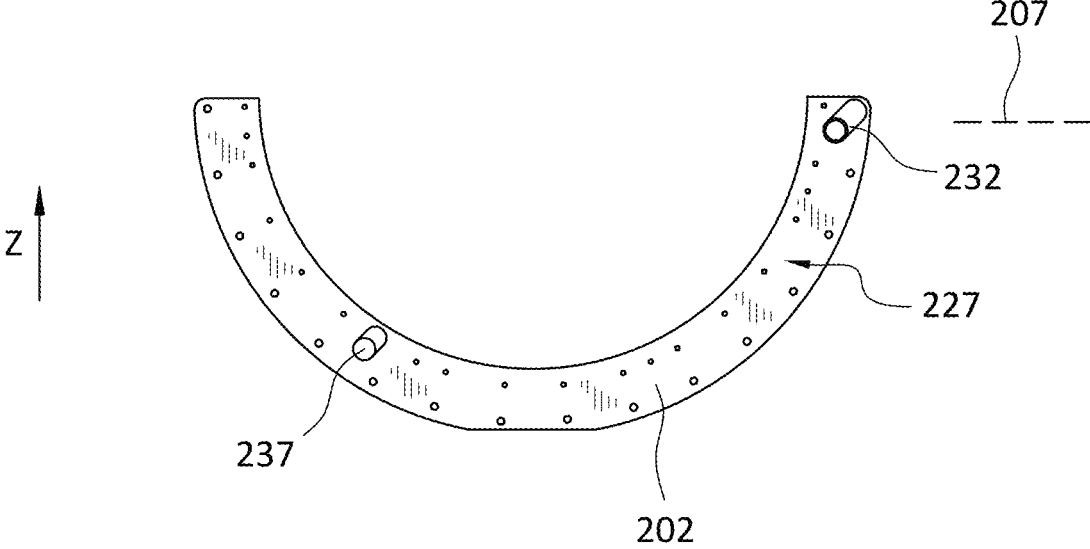

The pipe system 210 with the upwardly inclining first part 212 allows a desired amount of lubricant 300 to fill or accumulate inside the bearing housing 201 in the interior space 203, for example up to a desired lubricant level 301. This way, the pipe system 210 facilitates maintaining of sufficient level of lubricant inside the bearing housing 201. The pipe system 210 therefore helps to avoid lubrication starvation and to keep splashing losses low. An uncontrolled lubricant leakage out of the interior space can be avoided by the upwardly extending first part 212. In particular, an undesired leakage through a sealing 235 (FIG. 12) of the bearing arrangement 200 in case of sealing malfunction or failure can be minimized. The pipe system 210 is provided to allow a controlled draining of the lubricant 300. In an embodiment, the upwardly inclining first part 212 facilitates the presence of sufficient lubricant 300 up to the lubricant level 301 in the upper hemispherical portion 209 of the housing 201.

A higher lubricant level in the rotor bearing housing 201 has been shown to result in more lubricant 300 that is available in the load zone of the roller bearing 204.

For example, consider the pipe system 210 attached on the gearbox side of the bearing housing 201.

Figure 4:
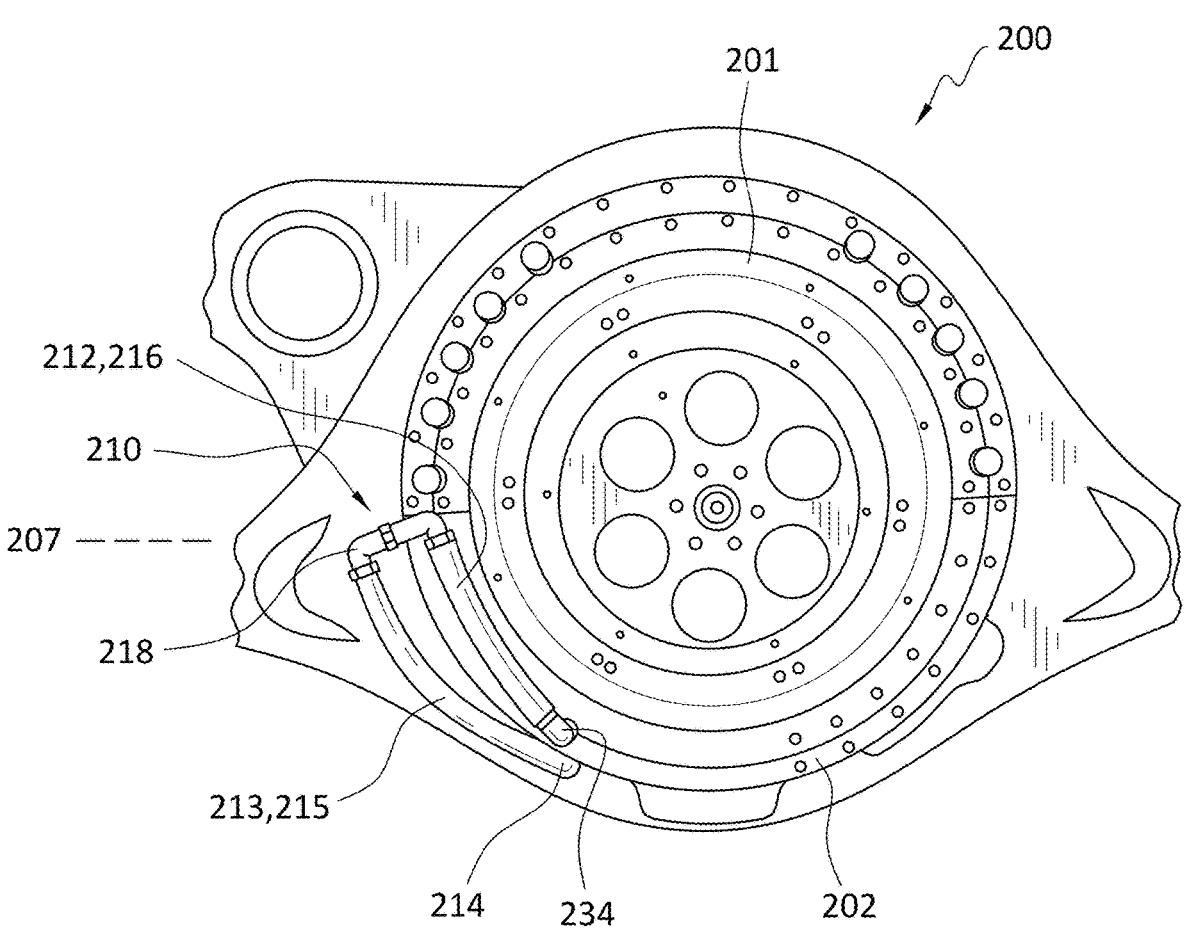

As shown in FIGS. 4 and 5, at the opening 206 a nozzle 234 with, for example, a 90° pipe angle, like an elbow, is connected. For example, the first part 212 may extend approximately a quarter circle upwards towards the center-line of the shaft 105, where the first part 212 is transitioned by the bended part 218, which for example includes a 180° pipe bend. The second part 213 transitioning from the first part 212 is led back, for example, parallel or substantially parallel to the first part 212 towards the vicinity of the nozzle. Thus, the pipe system 210 is for example comparable to a siphon.

The second part 212, for example, does not end significantly below the opening 206, so that a possible suction effect, which can lead to undesired removal or drain of lubricant out of the rotor bearing housing, is prevented. However, the lubricant 300 which escapes out of the outlet port 214 falls into the collection container 226 positioned below the outlet port 214. The operating principle is based, without being limited to it, on the fact that the hose routing increases the pipe friction resistance due to the geodetic height (to be overcome) and the length of the hoses 215, 216. This allows the lubricant level 301 in the rotor bearing housing 201 to be increased by up to 100%. Other factors such as hose diameter, length, et cetera, influence the extent of throttling of the lubricant. For example, longer hoses tend to increase the suction effect resulting in undesired removal or drain of lubricant out of the interior 203 by the pipe system 210, compared to shorter hoses.

For example, the nozzle, which is connected to the opening 206, includes a T-piece with two outlets. The first part 212 is mounted on a first one of the outlets of the T-piece. The second outlet of the T-piece allows grease exchange (drain only or active flushing) and is plugged with a drain valve or cap during normal operation.

FIG. 4 shows an example of the pipe system 210 in which the transition part 218 is provided as a separate element which is connected to the upwards hose 216 and the downwards hose 215. For example, the hoses 215, 216 are each flexible and the transition part 218 is rigid. Alternatively, the upward hose 216, the transition part 218 and the downwards hose are formed from a single hose, which is bent at the predetermined height 207, as shown in FIG. 3.

As shown in FIG. 5, the second part 213 can be omitted. The first part 212 with the upwards hose 216 extends upwards from a region around the bottom 224. The upwards hose 216 is connected to the bearing housing 201 via the fluidic connection 211 at the opening 206. The upwards hose 216 is arranged at the lower hemispherical portion 223. The bended part 218, which forms an upper end of the upwards hose 216, is arranged next to the upper hemispherical portion 209. According to further embodiments, the bended part 218 is arranged in the upper hemispherical portion 209. The arrangement may allow a free fall draining of the lubricant from the bended part 218.

FIG. 6 shows the pipe system 210 according to a further embodiment. Instead of the downwards hose 215 of FIG. 3, the second part 213 according to FIG. 6 includes a drain channel 217. In particular, the drain channel 217 is an open channel which is not closed radially. In other words, the drain channel 217 may not adjoin the bended part 218 along the entire circumference of the bended part 218. During operation, the lubricant 300 exits the bended part 218 and, for example, drops on and into the drain channel 217, for instance, like a free fall. The drain channel 217 guides the lubricant 300 to the collection container 226. The outlet port 214 is part of the drain channel 217. The drain channel 217 is inclined upwards from a first end facing the bended part 218 towards a second end facing the collection container 226.

The open drain channel 217 helps to avoid or mitigate suction effects that may result from lubricant 300 flowing downwards in the second part 213 in a closed pipe or hose. Furthermore, because the transition between the bended part 218 and the drain channel 217 is not fluid-tight, the pipe system 210 does not have to be separately vented.

Figure 7:
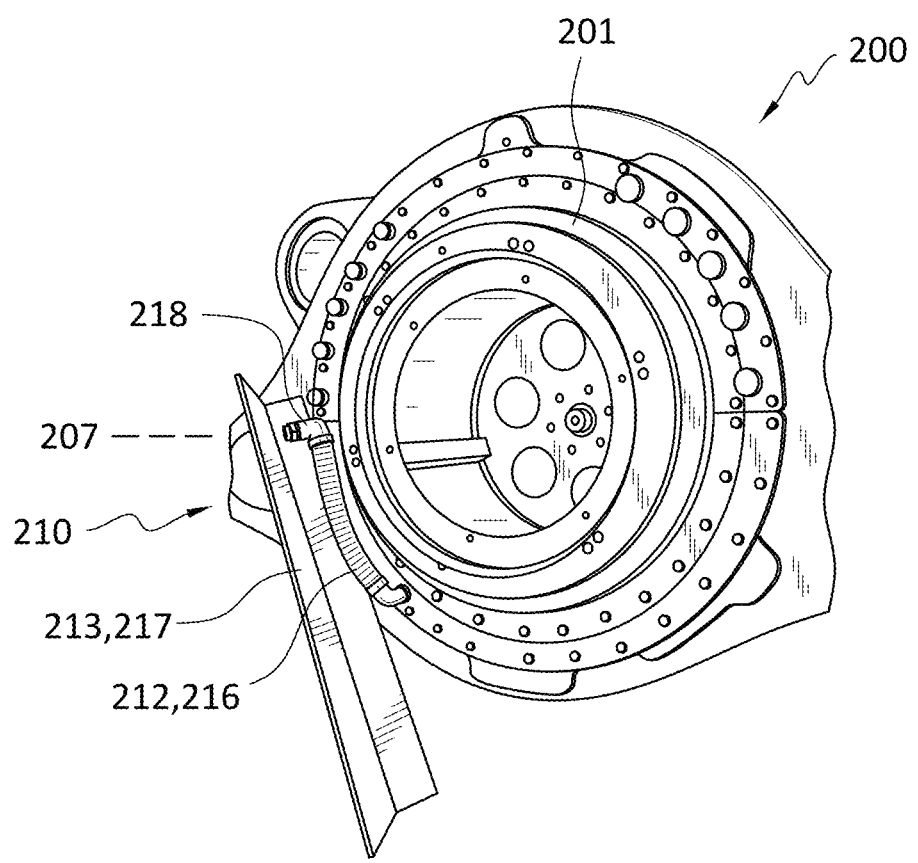

FIG. 7 shows the pipe system 210 with the open drain channel 217 in a further view. The transition part 218 is provided as a separate element which is connected to the upwards hose 216. For example, the hose 216 is flexible and the transition part 218 is rigid. Alternatively, the upward hose 216 and the transition part 218 are formed from a single hose, which is bent at the predetermined height 207, as shown in FIG. 6.

FIG. 8 shows the pipe system 210 according to a further embodiment. The pipe system 210 optionally includes a breather valve 219. Further, the pipe system 210 optionally includes a throttle valve 220. Further, the pipe system 210 optionally includes a thermal control module 222. It is possible to have just one or more of the breather valve 219, the throttle valve 220, and the thermal control module 222. Furthermore, other sensors and/or valves may be included by the pipe system 210.

The breather valve 219, the throttle valve 220, and/or the thermal control module 222 may also be included by the pipe system 210 according to the other embodiments shown in the other figures and described herein. Different combinations of the pipe system 210, the first part 212, the second part 213 and the valves and modules 219, 220, 222 are possible.

The breather valve 219 is arranged at the bended part 218 to allow venting of the pipe system 210, in particular, for the embodiment in which the second part 213 includes a radially closed downward hose 215. Alternately, the breather valve 219 may also be provided in the transition part 218 when the transition part 218 is a distinct element which couples the first part 212 and the second part 213, both being separate hoses, as for example shown in FIG. 4. The bended part 218 is arranged above the first part 212 and the second part 213 and therefore air, which is trapped in the pipe system 210, accumulates in the bended part 218. The breather valve 219 helps to deflate the air out of the pipe system 210.

The throttle valve 220 provides an additional damping and throttle effect to the pipe system 210. In particular, the throttle valve 220 helps to avoid a suction effect which could be caused by the lubricant 300 which flows down the second part 213. An unwanted suction of the lubricant 300 out of the interior space 203 can be avoided with the help of the throttle valve 220. For example, the throttle valve 220 is an adjustable valve, the resistance of which can be changed. According to a further embodiment, the throttle valve 220 is a valve with a fixed cross-section.

The thermal control module 222, for example, includes at least one of a passive thermal insulation, an electrical heating, and an electrical cooling. The thermal control module 222 is arranged for controlling the temperature inside the pipe system 210, in particular, the temperature of the lubricant 300 in the pipe system 210. By controlling the temperature, a desired viscosity and/or other properties of the lubricant 300 can be realized. Thus, a flow resistance can be kept constant over a wide temperature range and the overflow functionality is preserved even at low nacelle temperatures.

The bearing arrangement 200, for example, includes a control unit 236 to control the breather valve 219, the throttle valve 220 and/or the thermal control module 222. For example, the control unit 236 is connected to other valves and/or sensors. Environmental information, such as environmental temperature, can be determined and the control unit 236 is configured to control the valves 219, 220 and/or the thermal control module 222 dependent on the environmental information.

Figure 9:
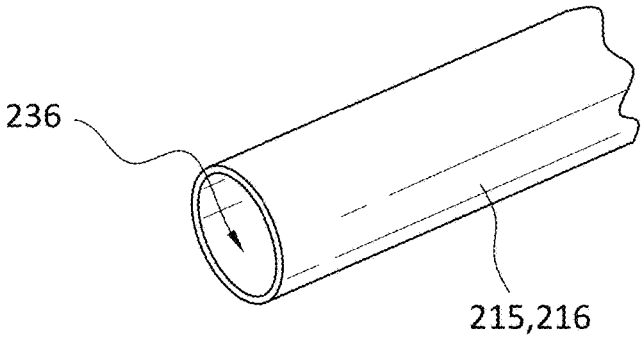

FIG. 9 shows a schematic detail of the downwards hose 215 and/or the upwards hose 216. An interior surface 221 of the downwards hose 215 and/or the upwards hose 216 includes a given and predetermined coefficient of friction and/or a given and predetermined roughness to obtain a desired throttle of the grease flow in the downwards hose 215 and/or upwards hose 216.

The dimensions of the pipe system 210, such as diameters, length, coefficient of friction and/or roughness of the interior surface 221, are selected to obtain a desired throttle and damping effect of the pipe system 210 to throttle a flow of the lubricant 300 out of the opening 206.

Figure 10:
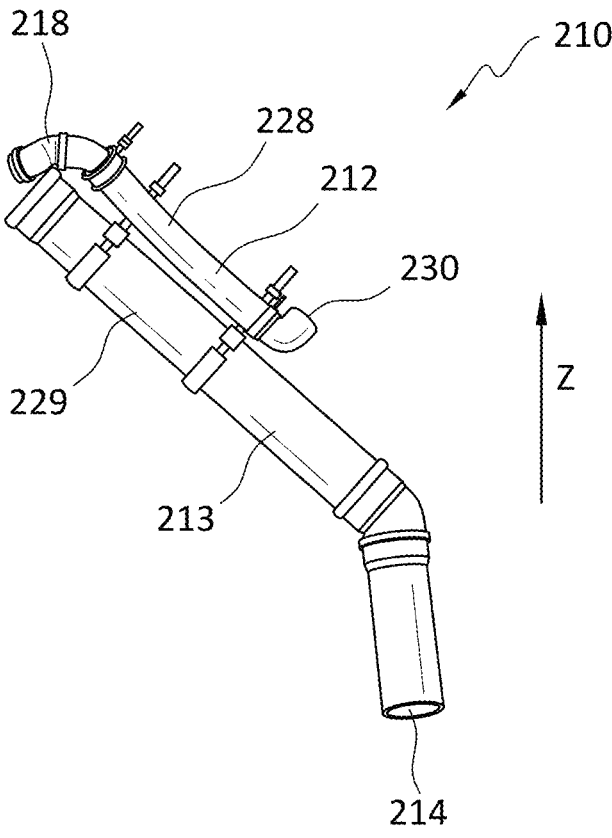

FIG. 10 shows the pipe system 210 according to a further embodiment. Instead of the downwards hose 215 and the upwards hose 216, the first part 212 according to FIG. 10 includes an upward pipe 228 and the second part 213 includes a downward pipe 229. Pipes 228, 229 and hoses 215, 216 can also be used together with each other as a combination of hoses and pipes. The upwards pipe 228 and the downwards pipe 229 are rigid and not flexible.

For example, a diameter or cross-section of the downwards pipe 229 is larger than the diameter or cross-section of the upwards pipe 228. Thus, suction effect effected by lubricant 300 flowing down the downwards pipe 229 can be avoided.

According to further embodiments, the diameter or cross-section of the upwards pipe 228 and of the downwards pipe 229 are equal.

As shown in FIG. 10, a transition between the bended part 218 and the downwards pipe 229 may be open, such that for example no additional venting is needed. The transition between the bended part 218 and the downwards pipe 229 is tightly closed according to further embodiments (not explicitly shown). For example, an additional breather valve 219 is arranged in such embodiments at the bended part 218.

FIGS. 11 to 14 show the pipe system 210 according to a further embodiment. Differently to the embodiments according to FIGS. 2 to 10, the pipe system 210, in particular the first part 212, is arranged at least partly inside the interior space 203. As shown in FIGS. 11 to 14, the first part 212 is completely arranged and positioned inside the interior space 203 of the bearing housing 201.

The bearing cover 202 includes an inward facing side 233. The inward facing side 233 faces the bearing 204 and the rolling elements 205.

The first part 212 is arranged on the inward facing side 233 of the bearing cover 202. For example, the first part 212 includes a rectangular pipe or tube in section. It is also possible that the first part 212 inside the interior space 203 includes a flexible hose or a round rigid tube or pipe.

The first part 212 includes the opening 206 through which lubricant 300 enters the first part 212. The opening 206 is part of the pipe system 210 and in particular of the first part 212. The opening 206 does not reach through the bearing cover 202 as in the other embodiments shown in FIGS. 2 to 10. In particular, the opening 206 and the inlet 230 are formed by a single, common inlet to the first part 212.

For example, the first part 212 is made of a metal and welded to the bearing cover 202. Other types of fastening are also possible, such as screwing or gluing. The first part 212 can also be made of other materials, for example, plastic. A mixture of different materials is also possible. The first part 212 can be flexible or rigid. A mixture of flexible sections and rigid sections is also possible.

The lubricant 300 enters the first part 212 inside the bearing housing 201 in the interior space 203. The lubricant 300 flows along the inclining or upwardly extending first part 212 up to the predetermined height 207 in the interior space 203.

At the predetermined height 207, a second opening 232 is arranged. The second opening 232 provides a passage through the bearing housing 201 and in particular through the bearing cover 202. The second opening 232 may serve as a passageway between the bearing interior space 203 and the outside 227.

For example, the second part 213 is fluidically connected to the second opening 232 at the outside 227 outside of the bearing housing 201.

Old or dirty lubricant can be drained via the opening 206 into the pipe system 210. After flowing through the opening 206, the lubricant 300 then first flows in the first part 212 inside the interior space 203, then exits the bearing housing 201 and the interior space 203 at the bended part 218 through the second opening 232. Subsequently, the lubricant 300 can be guided to the collection container 226, for example by the downwards inclined second part 213, which is not explicitly shown in FIGS. 11 to 14.

The bearing cover 202 includes an aperture 231 which is blocked during normal operation. If the bearing 204 is to be completely emptied and all lubricant 300 is to be removed, the aperture 231 can be selectively opened. During normal operation, the aperture 231 is closed to achieve the high lubricant level 301 and the lubricant 300 exits the interior space 203 only through the pipe system 210.

The first part 212 in the inside of the bearing housing 201 in the interior space 203 contributes to reduce free space in the interior space 203. The reduced free space allows a reduction of the amount of lubricant for the initial filling, which enables cost savings. The reduced free space also leads to more movement of the lubricant 300 during operation. Thus, the lubricant 300 is mixed better and stays more agile. Back feeding is improved and the overall lubricant regime is improved. Less of the lubricant 300 remains in the free space and the lubricant 300 better covers the rolling element 205.

The first part 212 in the inside of the bearing housing 201 contributes to make the lubricant 300 in the first part 212 less dependent on an environmental temperature. The lubricant 300 in the first part 212 thus has the same or similar properties as the other lubricant 300 in the interior space 203 and on the rolling elements 205.

The pipe system 210 according to the different embodiments and also according to the combination of the different embodiments not explicitly shown in the figures, allows a reliable lubrication of the bearing 204. The pipe system 210 provides a controlled draining of the lubricant 300 and an uncontrolled lubricant leakage can be avoided, in particular a leakage through the sealing 235. If too much of the lubricant 300 is in the interior space 203 and hydrodynamic pressure rises, the lubricant 300 is discharged in a controlled manner through the pipe system 210. Leakage at the seal 235 can be avoided.

The lubricant level 301 can be sufficiently maintained and thus, metal-metal contact, friction and wear are reduced. A lubricant level 301 above 90% of capacity of the interior space 203 is possible. Existing space at the outside 227 of the bearing housing 201 can be used flexibly. The first part 201 can be formed up to the desired predetermined height 207 through a specific selection of the hose 216 and/or the pipe 228 outside or inside the interior space 203.

The pipe system 210 makes the lubricant level 301 up to 100% possible. Greater safety against insufficient lubrication of the rotor bearing 204 is possible. The pipe system 210, with the first part 212 inclining upwards, functions like an overflow and/or pressure relief valve. If, for example, lubricant 300 is added even though the interior space 203 is already 100% full, excess lubricant flows out through the pipe system 210. The pipe system 210, in particular according to the embodiments of FIGS. 2 to 10, can be easily retrofitted to existing bearing housings 201 and existing configurations without costly reconfiguration. The bearing cover 202 according to FIGS. 11 to 14 can also be retrofitted to existing bearing housings 201 if enough free space is available for the first part 212 arranged inside the bearing housing 201.

The bearing arrangement 200 with the pipe system 210 reduces the risk of failure of the bearing 204. Outflow of the lubricant 300 can be controlled and thereby the amount of lubricant 300 can be increased and the lubricant can be increased and the lubricant level 301 can be kept at a desired height.

It is understood that the foregoing description is that of the preferred embodiments of the invention and that various changes and modifications may be made thereto without departing from the spirit and scope of the invention as defined in the appended claims.

REFERENCE SIGNS 100 wind turbine
101 direction of rotation
102 tower
104 foundation
105 shaft
106 nacelle
108 rotor
110 rotor blade
112 rotor hub
200 bearing arrangement
201 bearing housing
202 bearing cover
203 interior space
204 bearing
205 rolling element
206 opening
207 predetermined height 208 vertical height
209 upper hemispherical portion
210 pipe system
211 fluidic connection
212 first part
213 second part
214 outlet port
215 downwards hose
216 upwards hose
217 drain channel
218 transition part
219 breather valve
220 throttle valve
221 interior surface
222 thermal control module
223 lower hemispherical portion
224 bottom
225 top
226 container
227 outside
228 upwards pipe
229 downwards pipe
230 inlet
231 aperture
232 second opening
233 inwards facing side
234 nozzle
235 sealing
236 control unit
300 lubricant
301 lubricant level
Z vertical direction

The invention claimed is:

1. A bearing arrangement for a wind turbine, the bearing arrangement comprising:
    a bearing;
    a bearing housing defining an interior space for accommodating said bearing therein;
    a discharge opening for discharging lubricant from said interior space;
    a pipe system providing a fluidic connection with said discharge opening;
    said pipe system including a first part inclined upwardly to a predetermined height relative to said discharge opening to throttle a lubricant flow out of said interior space; and,
    said bearing arrangement defining a second opening arranged above said discharge opening.

2. The bearing arrangement of claim 1, wherein at least one of said bearing housing and said pipe system defines said discharge opening.

3. The bearing arrangement of claim 1, wherein said pipe system is arranged at least partly outside of said interior space and/or inside said interior space.

4. The bearing arrangement of claim 1, wherein said pipe system includes a second part; and, said second part is inclined downwardly and includes an outlet port.

5. The bearing arrangement of claim 4, wherein each of said first part and said second part includes a hose.

6. The bearing arrangement of claim 4, wherein said first part has a first diameter and said second part has a second diameter greater than said first diameter.

7. The bearing arrangement of claim 4, wherein said second part defines an open drain channel.

8. The bearing arrangement of claim 4, wherein said pipe system includes a transition part connecting said first part and said second part at said predetermined height.

9. The bearing arrangement of claim 1, wherein at least a portion of said pipe system defines an interior surface; and, said interior surface has a predetermined coefficient of friction and/or a predetermined roughness to throttle the lubricant flow out of said discharge opening.

10. The bearing arrangement of claim 1, wherein said bearing housing defines a vertical height and said predetermined height of said first part is at least one eighth of said vertical height of said bearing housing.

11. The bearing arrangement of claim 1, wherein said discharge opening is located at a lower hemispherical portion of said bearing housing.

12. The bearing arrangement of claim 8, wherein said pipe system includes a valve disposed at said transition part and/or a throttle valve to throttle the lubricant flow out of said interior space.

13. The bearing arrangement of claim 12, wherein said valve is a breather valve.

14. The bearing arrangement of claim 1, further comprising a thermal control module for regulating a temperature of said pipe system.

15. The bearing arrangement of claim 12, further comprising a control unit operatively coupled to at least one of said valve, said throttle valve and a heating arrangement.

16. A wind turbine, comprising:
    a nacelle;
    a bearing arrangement arranged within said nacelle;
    said bearing arrangement including:
    a bearing;
    a bearing housing defining an interior space for accommodating said bearing therein;
    a discharge opening for discharging lubricant from said interior space;
    a pipe system providing a fluidic connection with said discharge opening;
    said pipe system including a first part inclined upwardly to a predetermined height relative to said discharge opening to throttle a lubricant flow out of said interior space; and,
    the bearing arrangement defining a second opening arranged above said discharge opening.

* * * * *